(12) United States Patent
Konishi

(10) Patent No.: US 7,936,512 B2
(45) Date of Patent: May 3, 2011

(54) OPTICAL GATING SYSTEM USING MOIRÉ EFFECT

(75) Inventor: Tsuyoshi Konishi, Osaka (JP)

(73) Assignee: Osaka University, Osaka (JP)

( * ) Notice: Subject to any disclaimer, the term of this patent is extended or adjusted under 35 U.S.C. 154(b) by 231 days.

(21) Appl. No.: 12/447,504

(22) PCT Filed: Oct. 22, 2007

(86) PCT No.: PCT/JP2007/070570
§ 371 (c)(1),
(2), (4) Date: Apr. 28, 2009

(87) PCT Pub. No.: WO2008/053738
PCT Pub. Date: May 8, 2008

(65) Prior Publication Data
US 2010/0073758 A1    Mar. 25, 2010

(30) Foreign Application Priority Data

Oct. 30, 2006  (JP) .................................. 2006-294825

(51) Int. Cl.
G02B 27/44    (2006.01)
G01D 5/36    (2006.01)

(52) U.S. Cl. .... 359/566; 359/563; 359/588; 250/237 G; 385/37

(58) Field of Classification Search ............... 359/3, 24, 359/29, 35, 298, 563, 566–569; 356/237.2–237.4, 356/124, 335, 336, 344, 399, 401; 396/308, 396/340; 385/31, 37, 129; 430/22; 355/67, 355/71, 75

See application file for complete search history.

(56) References Cited

U.S. PATENT DOCUMENTS 5,384,573 A * 1/1995 Turpin .......................... 342/179
(Continued)

FOREIGN PATENT DOCUMENTS

JP    64-079733    3/1989
(Continued)

OTHER PUBLICATIONS

International Search Report issued Jan. 22, 2008 in the International (PCT) Application of which the present application is the U.S. National Stage.

*Primary Examiner* — Loha Ben
(74) *Attorney, Agent, or Firm* — Wenderoth, Lind & Ponack, L.L.P.

(57) ABSTRACT

To provide an optical gating system capable of performing single-shot, parallel, and ultrafast gating equal to or less than a subpicosecond, without depending on coherence. The optical gating system converts signal light to spatial characteristic signal light whose intensity distribution has spatial periodicity, and emits the spatial characteristic signal light to a gate region (13) so as to be obliquely incident on the gate region (13). In a closed state in an opening and closing operation of the gate region (13), a closed moiré fringe pattern (graph 11) is created in the gate region (13) by overlaying the spatial characteristic signal light and spatial characteristic closed light acting in a direction in which an intensity of the spatial characteristic signal light is decreased in the gate region (13). In an open state, an open moiré fringe pattern (graph 12) is created in the gate region (13) by overlaying the spatial characteristic signal light and spatial characteristic open light acting in a direction in which the intensity of the spatial characteristic signal light is increased in the gate region (13).

9 Claims, 15 Drawing Sheets

U.S. PATENT DOCUMENTS

| | | | |
|---|---|---|---|
| 5,477,319 A | 12/1995 | Shimonaka et al. | 356/484 |
| 5,812,629 A * | 9/1998 | Clauser | 378/62 |
| 6,476,405 B1 * | 11/2002 | Henshaw | 250/559.29 |
| 6,766,211 B1 * | 7/2004 | Ausschnitt | 700/117 |
| 6,771,362 B2 * | 8/2004 | Keren et al. | 356/124 |
| 6,937,344 B2 * | 8/2005 | Monshouwer et al. | 356/508 |
| 7,019,824 B2 * | 3/2006 | Wegmann et al. | 356/124 |
| 7,609,388 B2 * | 10/2009 | Arieli et al. | 356/512 |

FOREIGN PATENT DOCUMENTS

| | | |
|---|---|---|
| JP | 4-177104 | 6/1992 |
| JP | 6-252851 | 9/1994 |
| JP | 2000-088657 | 3/2000 |

\* cited by examiner

OPTICAL GATING SYSTEM USING MOIRÉ EFFECT

TECHNICAL FIELD

The present invention relates to an optical gating system using a moiré effect, and in particular relates to an optical gating system that is capable of performing high-sensitive, parallel, and ultrafast gating without the need for a nonlinear optical gate device.

BACKGROUND ART

In recent years, light is utilized as an essential element in every field of industry. This is because light has excellent properties such as an ultrahigh speed, an ultrawide band, noninvasiveness, and so on. Especially the ultrahigh speed is a unique property, as there is no phenomenon faster than light. Industrially, this property is considered as extremely important in ultrahigh-speed optical communication and the like. On the other hand, since there is no phenomenon faster than light, when measuring a transient change of state of light itself, a method of repeatedly performing measurement is often used. Aside from the measurement repetition method, there is also a method of performing measurement in a single shot. Examples of the single-shot measurement method include a method of using a streak camera that performs measurement by forcing a deflection of light, and a method of using ultrafast interference (optical spectrogram scope) with reference light (for example, see Patent Reference 1).
Patent Reference 1: Japanese Patent No. 3018173

DISCLOSURE OF INVENTION

Problems that Invention is to Solve

However, the former of the aforementioned techniques is limited in resolution and the like, since a deflection faster than light is impossible. The latter of the aforementioned techniques has difficulties in measurement of incoherent light, since the technique is predicated on coherence between measured light and gate light.

In industrial fields, measurement of incoherent light whose feature cannot be specified beforehand is also very important. Thus, the conventional optical measurement techniques are problematic in that repeated measurement is unavoidable due to the lack of a decisive method of scanning that exceeds the speed of light.

The present invention has been developed in view of the above problem, and has an object of providing an optical gating system that is capable of performing single-shot, parallel, and ultrafast gating equal to or less than a subpicosecond, without depending on coherence.

Means to Solve the Problems

To achieve the stated object, an optical gating system according to the present invention is (a) an optical gating system that, in a same manner as performing an opening and closing operation of a gate, controls passage of signal light incident on a gate region which functions as the gate, by using a moiré effect, the optical gating system including: (a1) a first spatial characteristic light emission unit that converts the signal light to first spatial characteristic light whose intensity distribution has spatial periodicity, and emits the first spatial characteristic light to the gate region so that the first spatial characteristic light is obliquely incident on the gate region; (a2) a second spatial characteristic light emission unit that emits, to the gate region, second spatial characteristic light whose intensity distribution has spatial periodicity, the second spatial characteristic light acting in a direction in which an intensity of the first spatial characteristic light is decreased in the gate region when overlaid with the first spatial characteristic light in the gate region; and (a3) a third spatial characteristic light emission unit that emits, to the gate region, third spatial characteristic light whose intensity distribution has spatial periodicity, the third spatial characteristic light acting in a direction in which the intensity of the first spatial characteristic light is increased in the gate region when overlaid with the first spatial characteristic light in the gate region, (a4) wherein in a closed state in the opening and closing operation, a first moiré fringe pattern is created in the gate region by overlaying the first spatial characteristic light and the second spatial characteristic light, and in an open state in the opening and closing operation, a second moiré fringe pattern is created in the gate region by overlaying the first spatial characteristic light and the third spatial characteristic light.

According to this, high-sensitive, parallel, and ultrafast gating equal to or less than a subpicosecond can be performed without depending on coherence of signal light.

Note that the present invention may be realized not only as an optical gating system but also as an optical gating method and the like.

Effects of the Invention

According to the present invention, arbitrary signal light for a predetermined time period can be measured in a single shot. Thus, measurement can be easily performed with high sensitivity and at low cost, without depending on coherence of signal light.

High-sensitive, parallel, and ultrafast gating equal to or less than a subpicosecond can be realized without depending on coherence of signal light.

NUMERICAL REFERENCES

Figure 1:
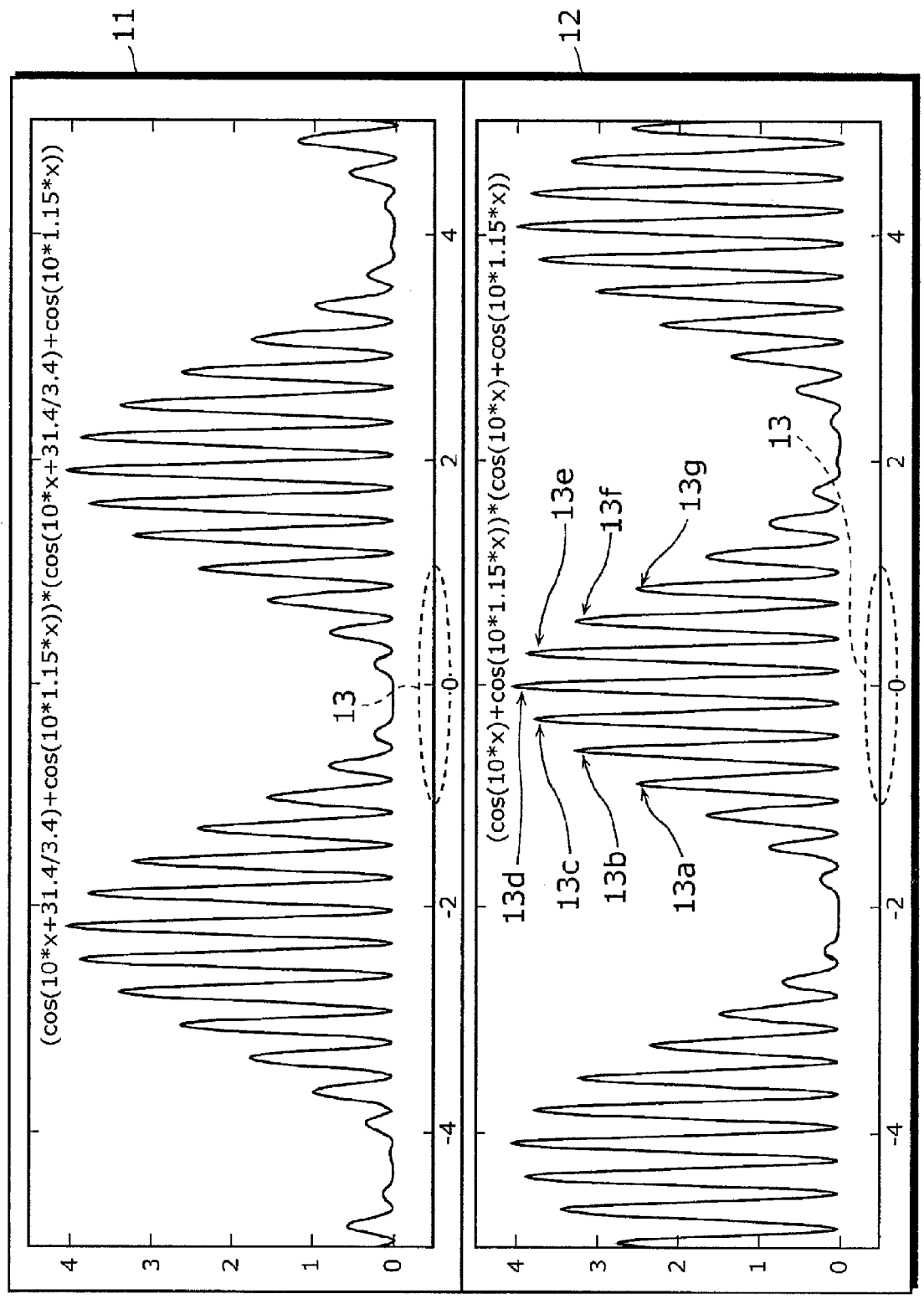
FIG. 1 shows an example of a closed moiré fringe pattern and an open moiré fringe pattern in an embodiment according to the present invention.

100 Optical gating system
101 Light source
104 Imaging apparatus
105 Image processing apparatus
111, 121, 128 Beam splitter
114, 115, 131, 134 Mirror
112 Signal light generation unit
113, 123, 133 Delay unit
116, 126, 136 Grating pattern
117, 127, 137 Collimator lens
122 Open light generation unit
132 Closed light generation unit

BEST MODE FOR CARRYING OUT THE INVENTION

Embodiment

The following describes an embodiment according to the present invention, with reference to drawings.

An optical gating system in this embodiment has the following features.

(a) An optical gating system, in a same manner as performing an opening and closing operation of a gate, controls passage of signal light incident on a gate region which functions as the gate, by using a moiré effect, the optical gating system including: (a1) a first spatial characteristic light emission unit that converts the signal light to first spatial characteristic light whose intensity distribution has spatial periodicity, and emits the first spatial characteristic light to the gate region so that the first spatial characteristic light is obliquely incident on the gate region; (a2) a second spatial characteristic light emission unit that emits, to the gate region, second spatial characteristic light whose intensity distribution has spatial periodicity, the second spatial characteristic light acting in a direction in which an intensity of the first spatial characteristic light is decreased in the gate region when overlaid with the first spatial characteristic light in the gate region; and (a3) a third spatial characteristic light emission unit that emits, to the gate region, third spatial characteristic light whose intensity distribution has spatial periodicity, the third spatial characteristic light acting in a direction in which the intensity of the first spatial characteristic light is increased in the gate region when overlaid with the first spatial characteristic light in the gate region, (a4) wherein in a closed state in the opening and closing operation, a first moiré fringe pattern is created in the gate region by overlaying the first spatial characteristic light and the second spatial characteristic light, and in an open state in the opening and closing operation, a second moiré fringe pattern is created in the gate region by overlaying the first spatial characteristic light and the third spatial characteristic light.

In view of the above, the following describes an optical system of gating in this embodiment A principle of the optical gating system in this embodiment is described first.

The optical gating system in this embodiment is a system that, as if to perform an opening and closing operation of a gate, controls passage of signal light incident on a region which functions as the gate (hereafter referred to as a gate region), by using a moiré effect. The signal light mentioned here is arbitrary light which may be any of coherent light and incoherent light. In detail, a moiré fringe pattern corresponding to an open or closed state is created in the gate region, as a substitute for the gate. Here, a closed moiré fringe pattern is created when blocking the passage of the signal light as if to close the gate, and an open moiré fringe pattern is created when allowing the passage of the signal light as if to open the gate (for example, see FIG. 1).

FIG. 1 shows an example of the closed moiré fringe pattern and the open moiré fringe pattern in this embodiment. In each of graphs 11 and 12, a horizontal axis represents a position, and a vertical axis represents an intensity.

Figure 2:
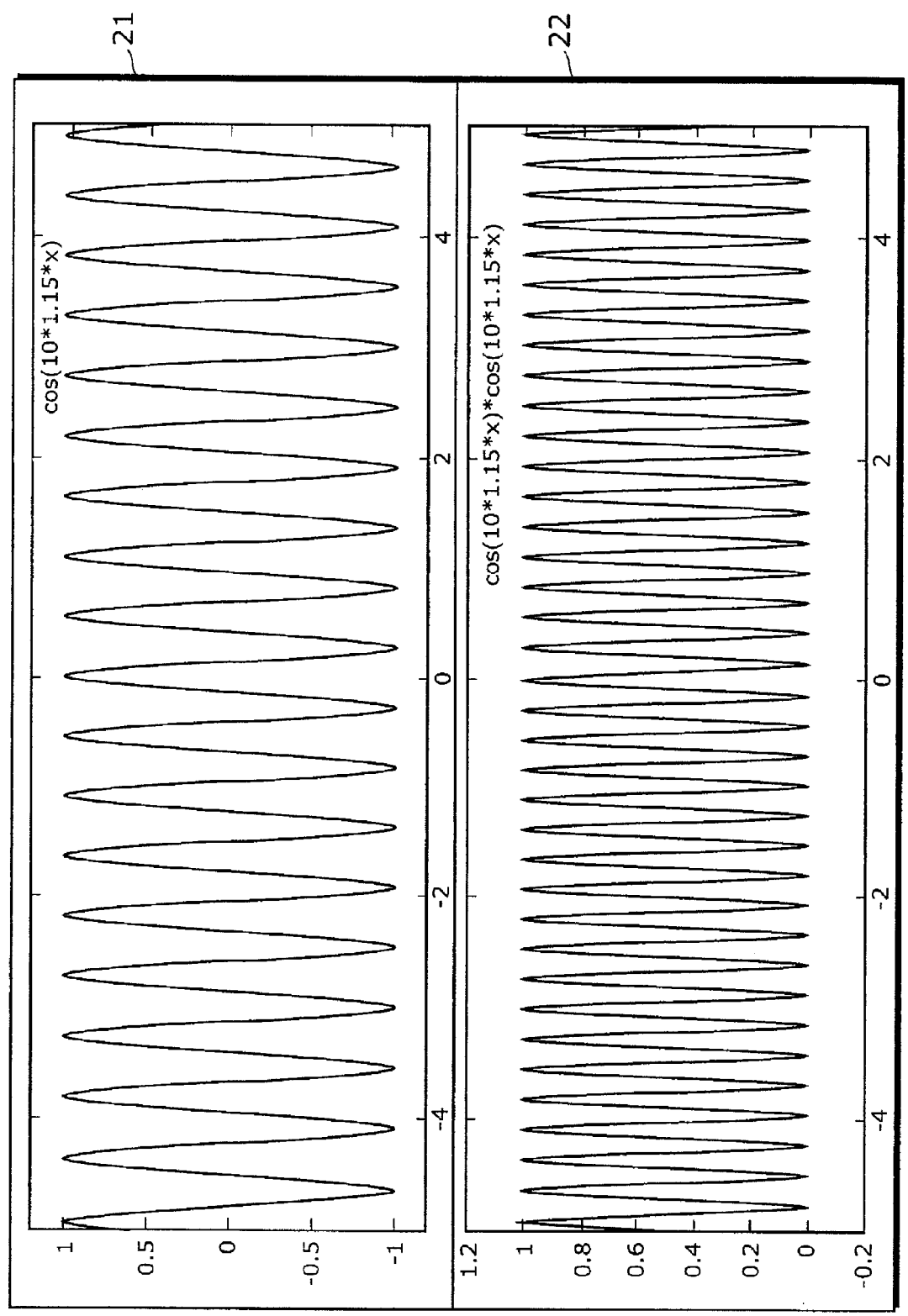
FIG. 2 shows an example of spatial characteristic signal light in the embodiment according to the present invention.
Figure 3:
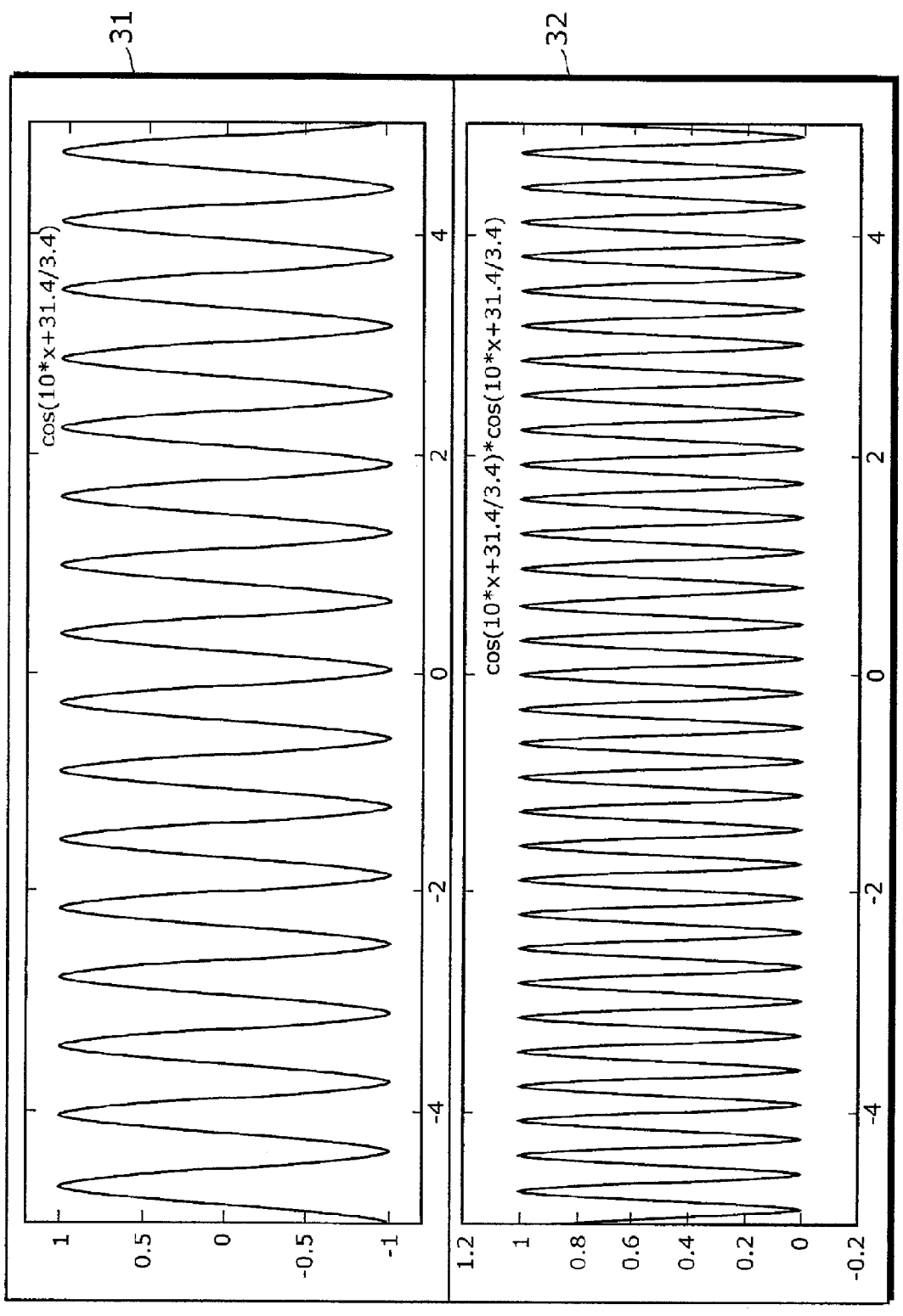
FIG. 3 shows an example of spatial characteristic closed light in the embodiment according to the present invention.

As shown in FIG. 1, the closed moiré fringe pattern (graph 11) is a moiré fringe pattern corresponding to the closed state in the opening and closing operation, and is created by overlaying spatial characteristic signal light (for example, see FIG. 2) and spatial characteristic closed light (for example, see FIG. 3). The open moiré fringe pattern (graph 12) is a moiré fringe pattern corresponding to the open state in the opening and closing operation, and is created by overlaying the spatial characteristic signal light (for example, see FIG. 2) and spatial characteristic open light (for example, see FIG. 4).

Figure 4:
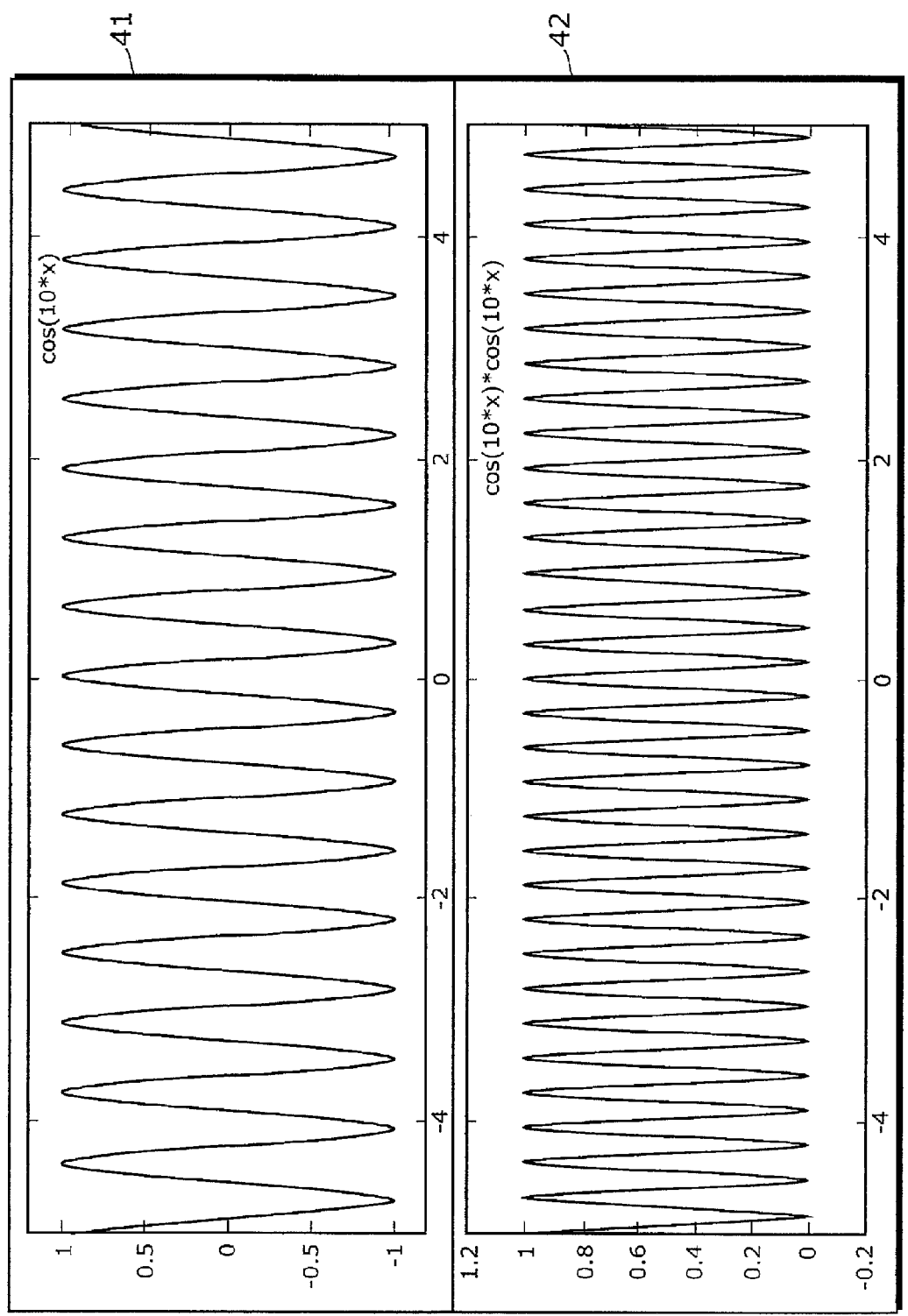
FIG. 4 shows an example of spatial characteristic open light in the embodiment according to the present invention.

FIG. 2 shows an example of the spatial characteristic signal light in this embodiment. FIG. 3 shows an example of the spatial characteristic closed light in this embodiment. FIG. 4 shows an example of the spatial characteristic open light in this embodiment. In each of graphs 21, 31, and 41, a horizontal axis represents a position, and a vertical axis represents an amplitude. In each of to graphs 22. 32, and 42, a horizontal axis represents a position, and a vertical axis represents an intensity.

As shown in FIG. 2, the spatial characteristic signal light (graph 21) is light which is obtained by converting the signal light using a first grating pattern or the like, and whose intensity distribution has spatial periodicity (graph 22). Moreover, the spatial characteristic signal light is light for forming a first fringe pattern in a gate region 13.

As shown in FIG. 3, the spatial characteristic closed light (graph 31) is light which is obtained by converting closed light using a second grating pattern or the like, and whose intensity distribution has spatial periodicity (graph 32). Moreover, the spatial characteristic closed light is light for forming a second fringe pattern that forms the closed moiré fringe pattern when overlaid with the first fringe pattern, in the gate region 13. Which is to say, the spatial characteristic closed light is light acting in a direction in which the intensity of the spatial characteristic signal light is decreased in the gate region 13. Note that the spatial characteristic closed light is emitted in a time period that excludes a predetermined time period from a time period during which the spatial characteristic signal light is emitted to the gate region 13.

As shown in FIG. 4, the spatial characteristic open light (graph 41) is light which is obtained by converting open light using a third grating pattern or the like, and whose intensity distribution has spatial periodicity (graph 42). Moreover, the spatial characteristic open light is light for forming a third fringe pattern that forms the open moiré fringe pattern when overlaid with the first fringe pattern, in the gate region 13. Which is to say, the spatial characteristic open light is light acting in a direction in which the intensity of the spatial characteristic signal light is increased in the gate region 13. Note that the spatial characteristic open light is emitted in the predetermined time period in the time period during which the spatial characteristic signal light is emitted to the gate region 13.

Accordingly, in the closed moiré fringe pattern (graph 11), a region that is low in intensity occupies most of the gate region 13. In the open moiré fringe pattern (graph 12), a plurality of regions that are high in intensity such as crests 13$a$ to 13$g$ are present in the gate region 13.

Thus, the optical gating system can block or permit the passage of the signal light incident on the gate region 13, as if to close or open the gate.

Moreover, the spatial characteristic signal light obtained from the signal light is obliquely incident on the gate region. In this way, a time component of the signal light can be associated with a space of the gate region. This is because the oblique incidence causes an optical path difference to occur according to a position of incidence. Consider an example of parallel signal light incident on the gate region at one time. In such a case, signal light incident on an upper part of the gate region comes later than signal light incident on a lower part of the gate region. Which is to say, portions of signal light at respective times according to an optical path difference are simultaneously incident on the same gate region. This enables signal light over a predetermined time period to be extracted in parallel in a single shot.

The moiré effect used by the optical gating system in this embodiment is described next.

Figure 5:
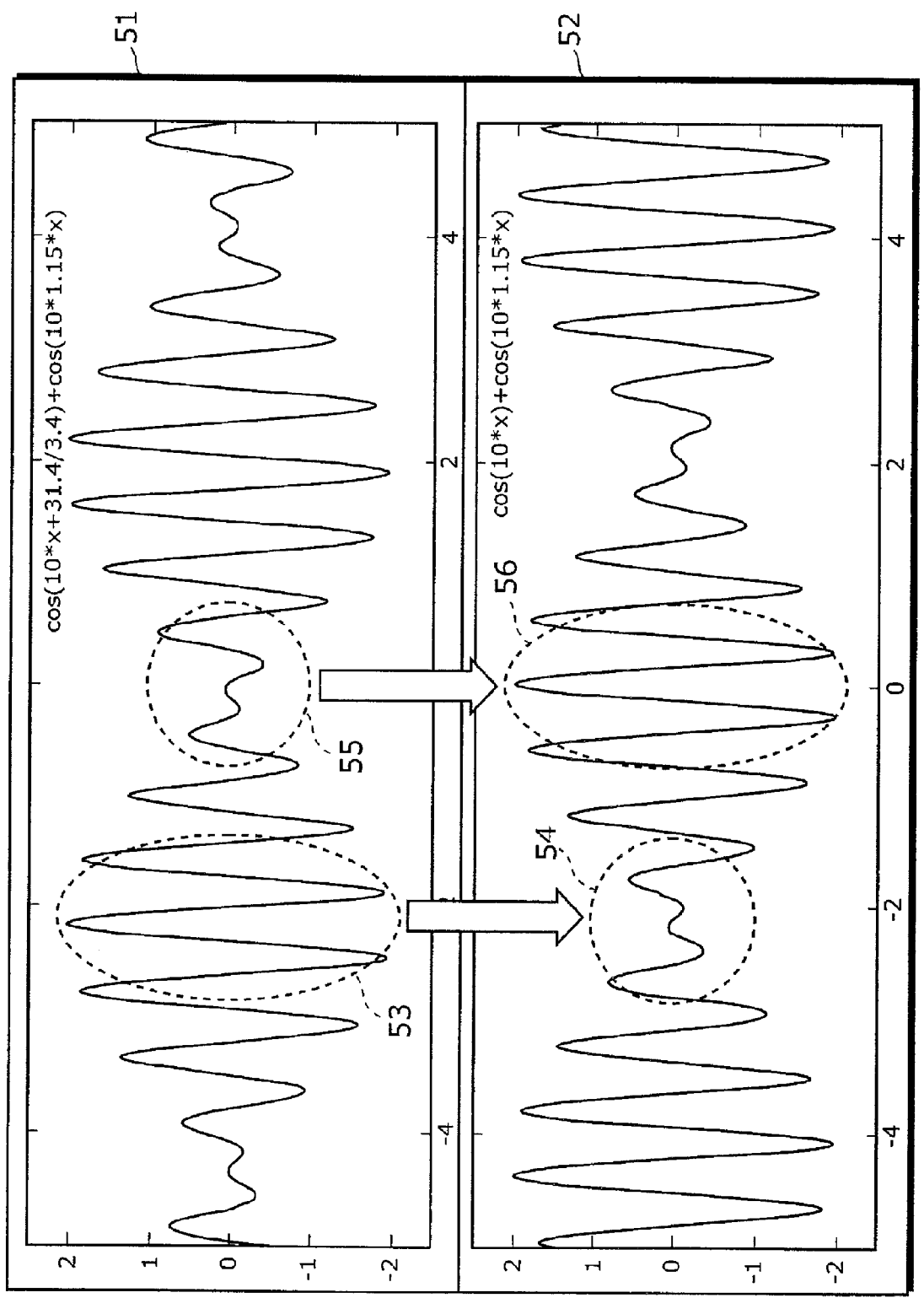
FIG. 5 shows an overview of moiré used in an optical gating system in the embodiment according to the present invention.

FIG. 5 shows an overview of moiré used by the optical gating system in this embodiment. In each of graphs 51 and 52, a horizontal axis represents a position, and a vertical axis represents an amplitude.

As shown in FIG. 5, for example when two types of light with different phases such as the spatial characteristic signal light ($\cos(10*1.15*x)$) and the spatial characteristic closed light ($\cos(10*x+31.4/3.4)$) are overlaid with each other (graph 51), a moiré fringe pattern where brightness and darkness are uniformly repeated appears (graph 11). Furthermore, when the phase is slightly shifted from the spatial characteristic closed light ($\cos(10*x+31.4/3.4)$) to, for example, the spatial characteristic open light ($\cos(10*x)$) (graph 52), a moiré fringe pattern where the brightness and darkness repetition is inverted appears (graph 12).

Thus, a moiré fringe pattern is created by overlaying two patterns having regularity with each other. Especially when straight-line patterns, curved-line patterns, point patterns, or the like having periodicity are overlaid with each other, a moiré fringe pattern different from the original periodicity appears. Such a moiré fringe pattern can also be created by overlaying two patterns having different pitches. Moreover, even when two patterns have a same pitch, the moiré fringe pattern can be created by rotating one pattern by small angle θ and overlaying the two patterns. Furthermore, by shifting in phase, it is possible to invert the brightness and darkness, such as darkening a bright region as in the case of a region 53 to a region 54, or brightening a dark region as in the case of a region 55 to a region 56.

The following describes a structure of the optical gating system in this embodiment.

Figure 6:
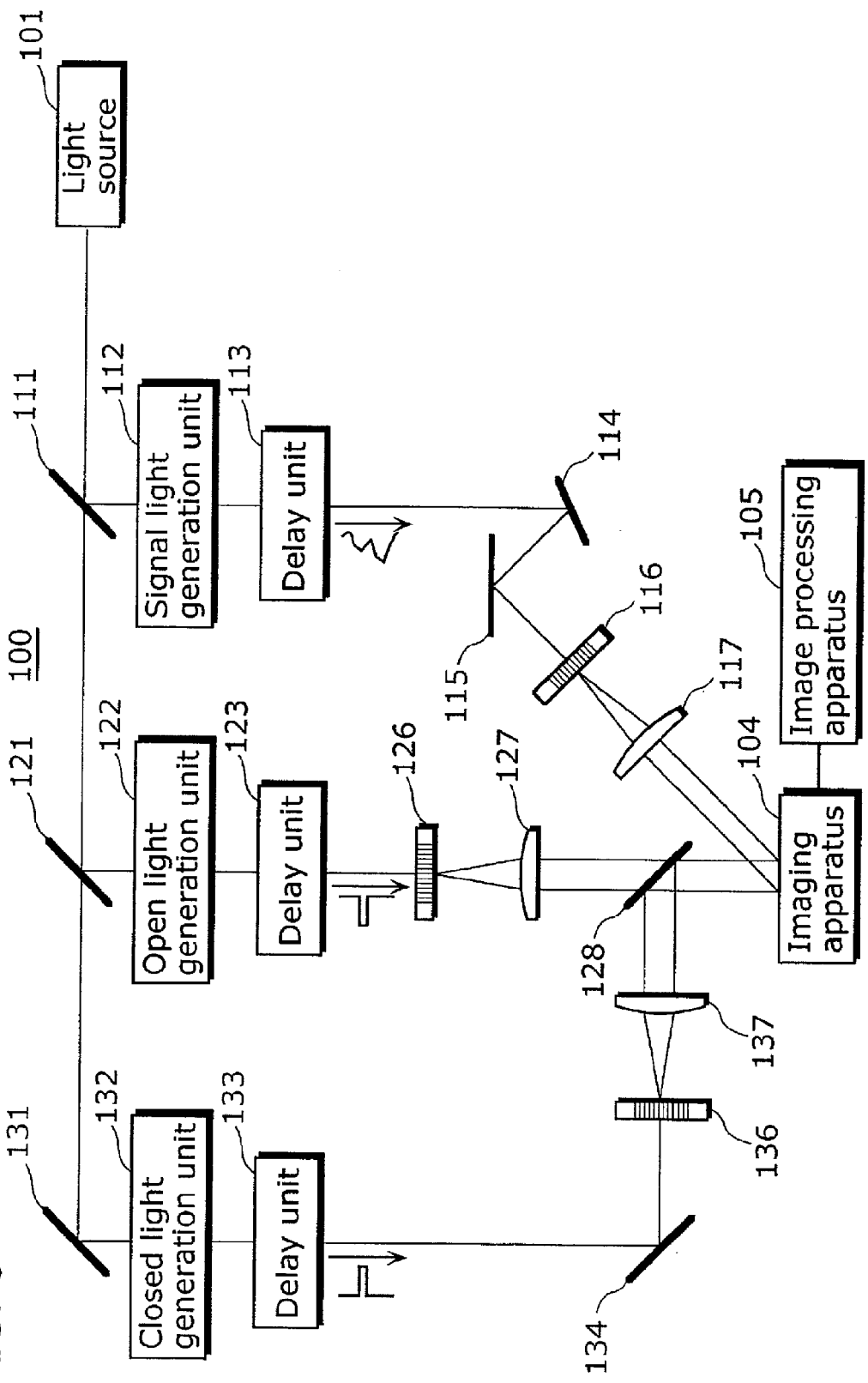
FIG. 6 shows a structure of the optical gating system in the embodiment according to the present invention.

FIG. 6 shows the structure of the optical gating system in this embodiment. As shown in FIG. 6, an optical gating system 100 includes, for example, a light source 101, an imaging apparatus 104, an image processing apparatus 105, an optical system that generates signal light, and an optical system that generates gate light for controlling the opening and closing operation of the gate region 13.

Here, the closed light and the open light are used as the gate light. The spatial characteristic closed light is light obtained by converting the closed light to light whose intensity distribution has spatial periodicity. The spatial characteristic open light is light obtained by converting the open light to light whose intensity distribution has spatial periodicity. To obtain light having spatial characteristics from each of the signal light, the closed light, and the open light, a well-known diffraction phenomenon is employed. Each optical element is arranged so that an image plane 141 of an imaging device included in the imaging apparatus 104 coincides with the gate region. When the open moiré fringe pattern is projected on the image plane which is positioned to the gate region, the open moiré fringe pattern projected on the image plane is captured by the imaging apparatus 104. An intensity distribution of the signal light in a direction in which the signal light travels in the gate region is extracted from a bright portion of the captured open moiré fringe pattern, and a time waveform of the signal light is specified from the extracted intensity distribution.

Light emitted from the light source 101 is branched by a beam splitter 111, into light entering the optical system that generates the signal light and light entering the optical system that generates the gate light.

The light entering the optical system that generates the signal light enters a signal light generation unit 112, as a source of signal light emitted from the signal light generation unit 112.

The signal light generation unit 112 generates, for example, a transmitted wave, a reflected wave, or the like by applying the incoming light to a measurement object. The signal light generation unit 112 emits the generated transmitted wave, reflected wave, or the like as the signal light. Note that the transmitted wave or reflected wave may include fluorescence, phosphorescence, and the like.

The signal light emitted from the signal light generation unit 112 enters a delay unit 113. The delay unit 113 adjusts an emission timing of the signal light. The signal light whose emission timing is adjusted by the delay unit 113 passes through mirrors 114 and 115 and enters a grating pattern 116 (first grating pattern).

The grating pattern 116 is formed by arranging a plurality of linear grating elements which extend in a first axial direction, with a first pitch in a second axial direction orthogonal to the first axis. In addition, the grating pattern 116 is situated so that the signal light is vertically incident on a plane where the plurality of grating elements are formed. The incident signal light is transmitted and emitted as the spatial characteristic signal light.

The spatial characteristic signal light emitted from the grating pattern 116 is converted to a parallel pencil of light by a collimator lens 117, and enters the imaging apparatus 104.

Note that a moiré formation grating such as the grating patterns 116, 126, 136, and the like may also be formed using a liquid crystal spatial light modulator (SLM). In this case, by electrically changing a liquid crystal pattern of the liquid crystal spatial light modulator, the grating width, phase, angle, and so on can be automatically adjusted, which contributes to greater usability.

Figure 7:
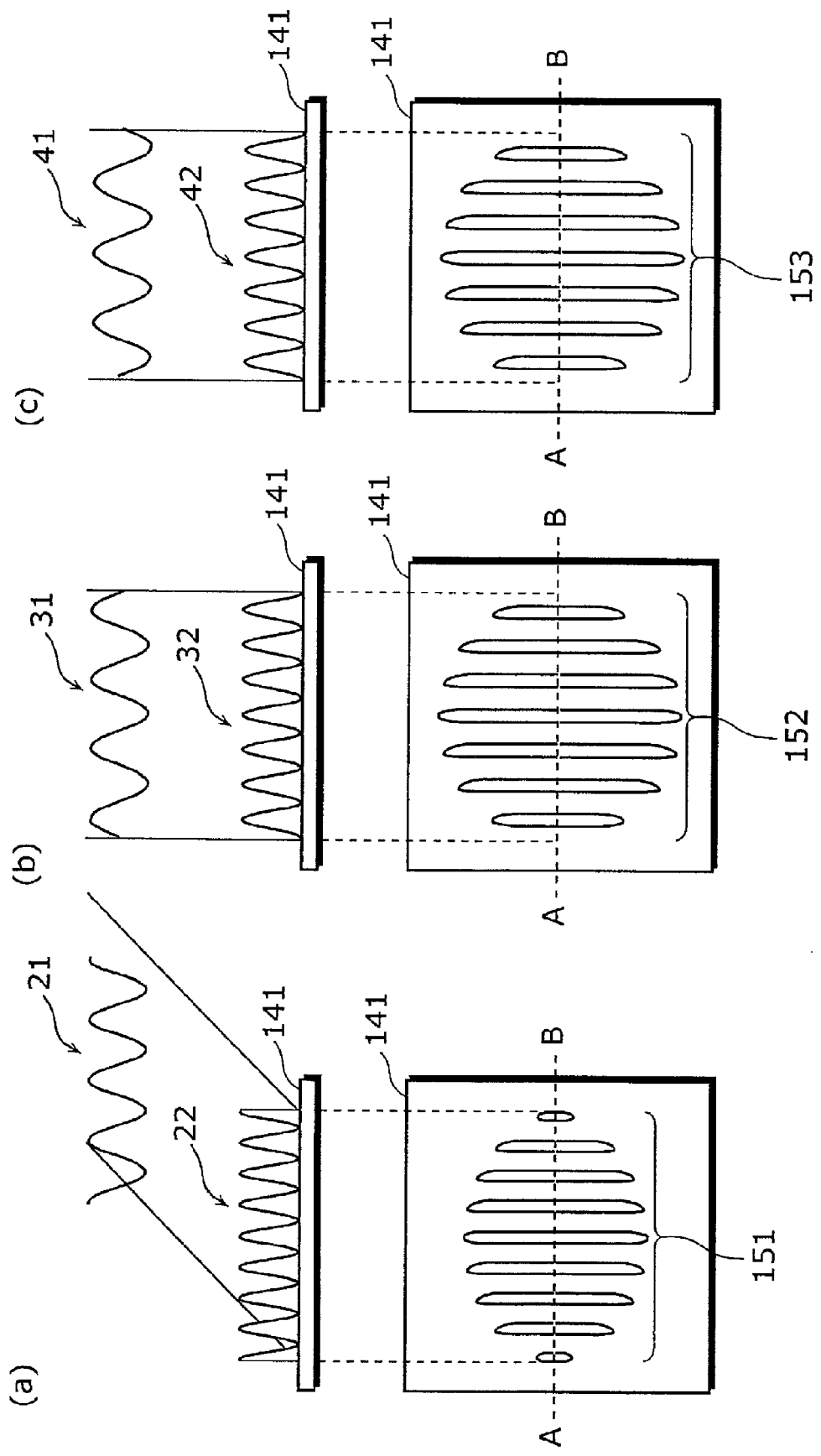
In FIG. 7, (a) shows a situation where only the spatial characteristic signal light is incident on an image plane in the embodiment according to the present invention, (b) shows a situation where only the spatial characteristic closed light is incident on the image plane in the embodiment according to the present invention, and (c) shows a situation where only the spatial characteristic open light is incident on the image plane in the embodiment according to the present invention.

(a) in FIG. 7 shows a situation where only the spatial characteristic signal light is incident on the image plane in this embodiment. Here, the spatial characteristic signal light (graph 21) is obliquely incident on the image plane 141, as shown in (a) in FIG. 7. As a result, a fringe pattern 151 (graph 22) obtained from the spatial characteristic signal light (graph 21) appears on the image plane 141.

Figure 8:
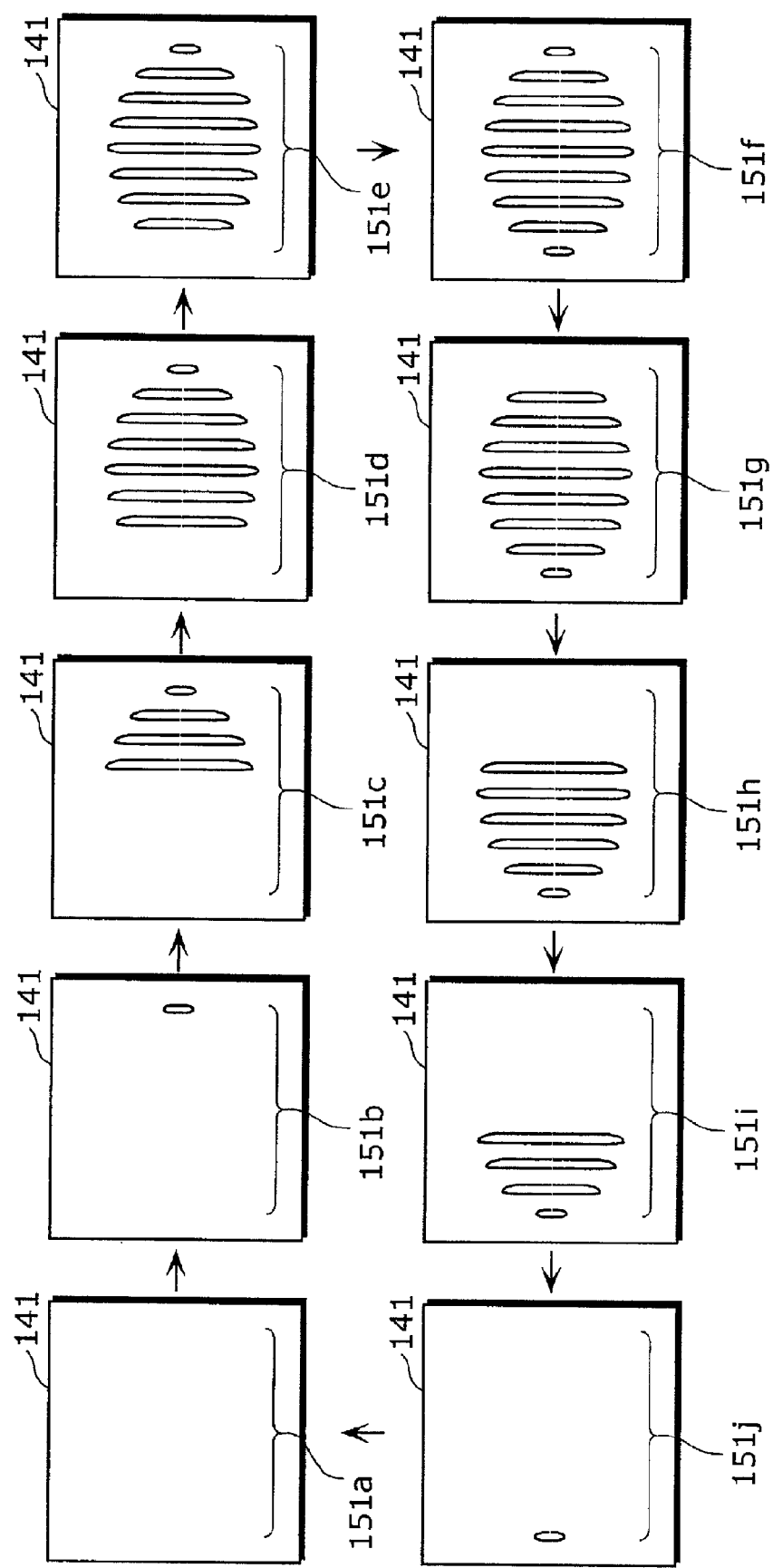
FIG. 8 shows a change in fringe pattern of the spatial characteristic signal light in the embodiment.

FIG. 8 shows a change in fringe pattern of the spatial characteristic signal light in this embodiment. As shown in FIG. 8, the spatial characteristic signal light (graph 21) travels on the image plane 141 from the right side (side B) to the left side (side A) along line A-B, approximately at the speed of light. In more detail, before the emission of the signal light is started by the signal light generation unit 112, nothing is projected on the image plane 141. Subsequently, when the emission of the signal light is started by the signal light generation unit 112 and the spatial characteristic signal light (graph 21) begins to reach the image plane 141, fringe patterns 151a to 151e are projected on the image plane 141 in sequence. Once the spatial characteristic signal light (graph 21) has reached the image plane 141, a fringe pattern 151f is projected on the image plane 141.

After this, when the emission of the signal light is completed by the signal light generation unit 112 and the spatial characteristic signal light (graph 21) begins to stop reaching the image plane 141, fringe patterns 151f to 151j are projected on the image plane 141 in sequence. Once the spatial characteristic signal light (graph 21) has stopped reaching the image plane 141, nothing is projected on the image plane 141.

Figure 9:
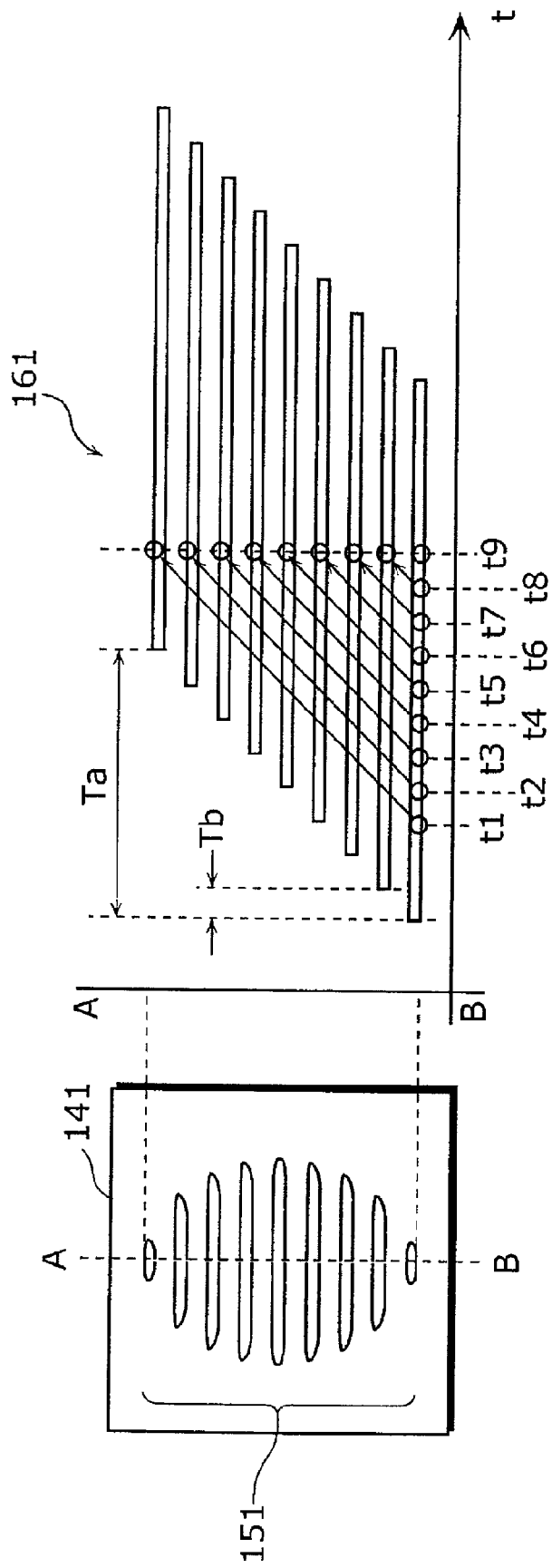
FIG. 9 shows a time displacement in line A-B of the fringe pattern of the spatial characteristic signal light in the embodiment.

FIG. 9 shows a time displacement in line A-B of the fringe pattern of the spatial characteristic signal light in this embodiment. As a result of the oblique incidence of the spatial characteristic signal light on the image plane 141 along line A-B, the fringe pattern 151 expands along line A-B, as shown in FIG. 9. The spatial characteristic signal light for a time period corresponding to an incidence angle is simultaneously incident on the image plane.

Note that time Ta is a time period required for the spatial characteristic signal light to travel through the image plane, and time Tb is a time period required for the spatial characteristic signal light to travel through a crest.

Suppose the fringe pattern 151 is sampled at line A-B for a predetermined time period. In this case, as shown by the time displacement (graph 161) of the fringe pattern 151, the fringe pattern 151 is approximately constant while the spatial characteristic signal light 21 is incident. Accordingly, even when the spatial characteristic signal light 21 travels from right to left along line A-B, the fringe pattern 151 itself does not move. However, the spatial characteristic signal light which appears at a lowest (side B) crest at time t1 travels to a next higher crest (toward side A) at time t2. The spatial characteristic signal light travels through crests in sequence, and moves to a highest (side A) crest at time t9. This being so, when the open moiré fringe pattern is left to appear longer than time Tb, the spatial characteristic signal light travels through crests for the time period during which the open moiré fringe pattern appears, which causes an obscure image.

As shown in FIG. 6, the light entering the optical system that generates the gate light is further branched by a beam splitter 121, into light passing through a mirror 131 and entering a closed light generation unit 132 as a source of closed light emitted from the closed light generation unit 132 and light entering an open light generation unit 122 as a source of open light emitted from the open light generation unit 122.

The closed light generation unit 132 generates, for example, light whose amplitude is constant in the closed state and 0 in the open state, from the incoming light. The closed light generation unit 132 emits the generated light as the closed light.

The closed light emitted from the closed light generation unit 132 enters a delay unit 133. The delay unit 133 adjusts an emission timing of the closed light. The closed light whose emission timing is adjusted by the delay unit 133 passes through a mirror 134 and enters a grating pattern 136 (second grating pattern).

The grating pattern 136 is formed by arranging a plurality of linear grating elements which extend in a third axial direction, with a second pitch in a fourth axial direction orthogonal to the third axis. In addition, the grating pattern 136 is situated so that the closed light is vertically incident on a plane where the plurality of grating elements are formed. The incident closed light is transmitted and emitted as the spatial characteristic closed light.

The spatial characteristic closed light emitted from the grating pattern 136 is converted to a parallel pencil of light by a collimator lens 137, passes through a beam splitter 128, and enters the imaging apparatus 104.

(b) in FIG. 7 shows a situation where only the spatial characteristic closed light is incident on the image plane in this embodiment. Here, the spatial characteristic closed light (graph 31) is vertically incident on the image plane 141, as shown in (b) in FIG. 7. As a result, a fringe pattern 152 (graph 32) obtained from the spatial characteristic closed light (graph 31) appears on the image plane 141.

The open light generation unit 122 generates, for example, light whose amplitude is 0 in the closed state and constant in the open state, from the incoming light. The open light generation unit 122 emits the generated light as the open light.

The open light emitted from the open light generation unit 122 enters a delay unit 123. The delay unit 123 adjusts an emission timing of the open light. The open light whose emission timing is adjusted by the delay unit 123 enters a grating pattern 126 (third grating pattern).

The grating pattern 126 is formed by arranging a plurality of linear grating elements which extend in a fifth axial direction, with a third pitch in a sixth axial direction orthogonal to the fifth axis. In addition, the grating pattern 126 is situated so that the open light is vertically incident on a plane where the plurality of grating elements are formed. The incident open light is transmitted and emitted as the spatial characteristic open light.

The spatial characteristic open light emitted from the grating pattern 126 is converted to a parallel pencil of light by a collimator lens 127, passes through the beam splitter 128, and enters the imaging apparatus 104.

(c) in FIG. 7 shows a situation where only the spatial characteristic open light is incident on the image plane in this embodiment. Here, the spatial characteristic open light (graph 41) is vertically incident on the image plane 141, as shown in (c) in FIG. 7. As a result, a fringe pattern 153 (graph 42) obtained from the spatial characteristic open light (graph 41) appears on the image plane 141.

Thus, by using the closed light and the open light as the gate light, it is possible to switch between the open moiré fringe pattern and the closed moiré fringe pattern in the opening and closing operation.

Figure 10:
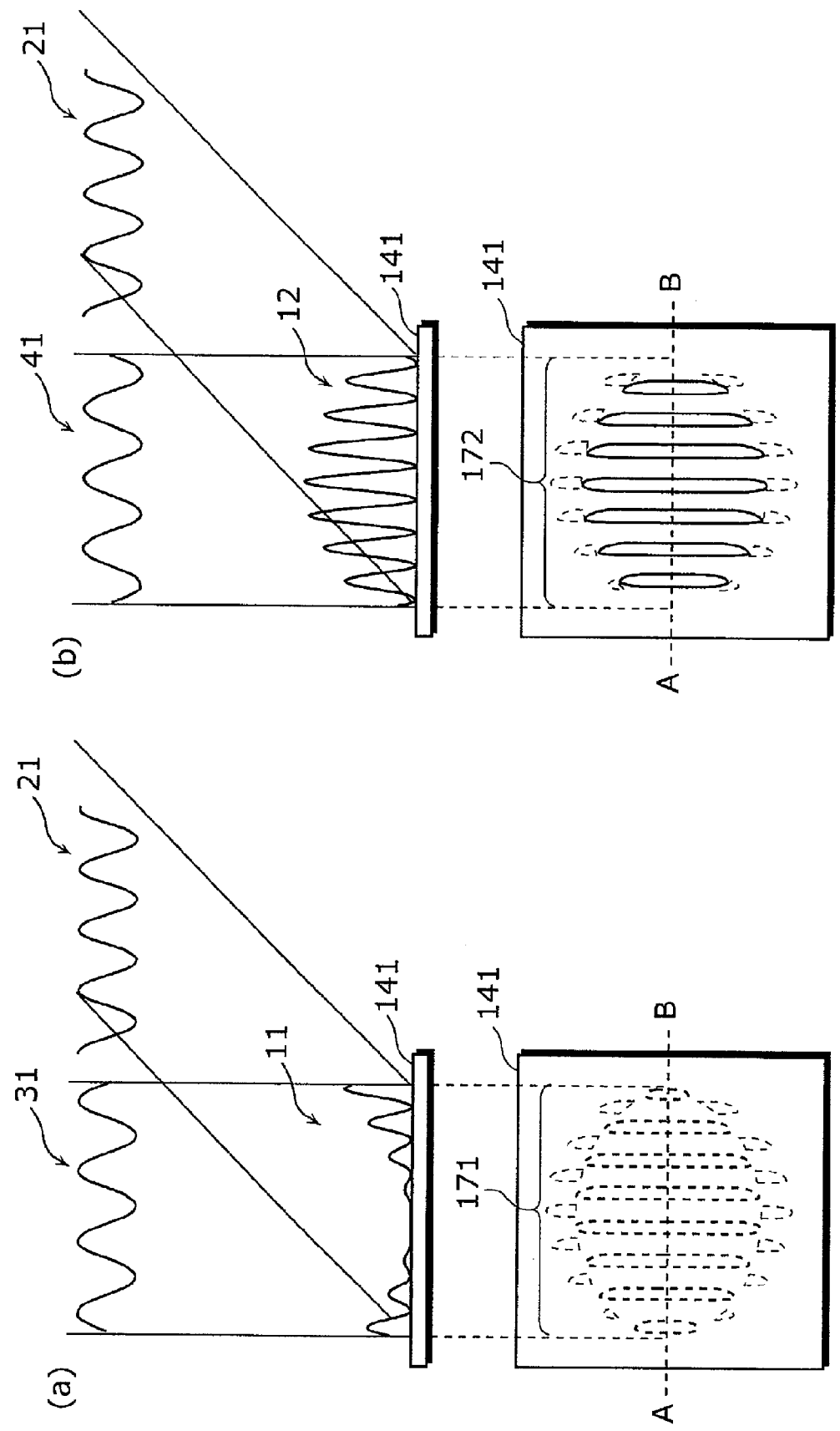
In FIG. 10, (a) shows a situation where the closed moiré fringe pattern appears on the image plane in the embodiment, and (b) shows a situation where the open moiré fringe pattern appears on the image plane in the embodiment.

(a) in FIG. 10 shows a situation where the closed moiré fringe pattern appears on the image plane in this embodiment.

Suppose the delay units 113 and 133 adjust the emission timings so that the spatial characteristic signal light (graph 21) and the spatial characteristic closed light (graph 31) enter the imaging apparatus 104 simultaneously, as shown in (a) in FIG. 10. In such a case, the spatial characteristic signal light (graph 21) and the spatial characteristic closed light (graph 31) overlay with each other, as a result of which a closed moiré fringe pattern 171 (graph 11) appears on the image plane 141.

Likewise, (b) in FIG. 10 shows a situation where the open moiré fringe pattern appears on the image plane in this embodiment. Suppose the delay units 123 and 113 adjust the emission timings so that the spatial characteristic signal light (graph 21) and the spatial characteristic open light (graph 41) enter the imaging apparatus 104 simultaneously, as shown in (b) in FIG. 10. In such a case, the spatial characteristic signal light (graph 21) and the spatial characteristic open light (graph 41) overlay with each other, as a result of which an open moiré fringe pattern 172 (graph 12) appears on the image plane 141.

The optical gating system 100 captures the open moiré fringe pattern appearing on the image plane 141 by the imaging apparatus 104, and performs image processing on image data of the captured open moiré fringe pattern by the image processing apparatus 105. When doing so, an intensity is extracted from a plurality of crests (regions which are high in intensity) along line A-B, in image data corresponding to line A-B of the image plane 141. The intensity of the signal light can be specified by using the extracted intensity and a preset intensity of each of the closed light and the open light.

Here, the signal light generation unit 112, the open light generation unit 122, and the closed light generation unit 132 may generate the signal light, the open light, and the closed light using a common light source or different light sources.

Note that, before the image captured by the imaging apparatus 104 is submitted to the image processing by the image processing apparatus 105, an amplitude equal to or less than a predetermined amplitude is removed.

The above describes an example where the method of overlaying light transmitted through grating patterns is used as the method of creating a fringe pattern on the image plane 141. However, a fringe pattern on the image plane 141 may be created using a method other than the method of overlaying light transmitted through grating patterns.

Moreover, the first pitch of the grating pattern 116 and the second pitch of the grating pattern 136 may be the same or different. When the first pitch and the second pitch are different, the grating pattern 116 and the grating pattern 136 may be placed without a small rotation so that the first axis and the third axis are in parallel with each other.

Moreover, the first pitch of the grating pattern 116 and the third pitch of the grating pattern 126 may be the same or different. When the first pitch and the third pitch are different, the grating pattern 116 and the grating pattern 126 may be placed without a small rotation so that the first axis and the fifth axis are in parallel with each other.

Moreover, the second pitch of the grating pattern 136 and the third pitch of the grating pattern 126 may be the same or different. When the second pitch and the third pitch are different, the grating pattern 136 and the grating pattern 126 may be placed without a small rotation so that the third axis and the fifth axis are in parallel with each other.

The following describes the moiré fringe pattern created by the signal light and the gate light in this embodiment.

FIGS. 11 to 15 show an intensity displacement in line A-B of the image plane in this embodiment.

Figure 11:
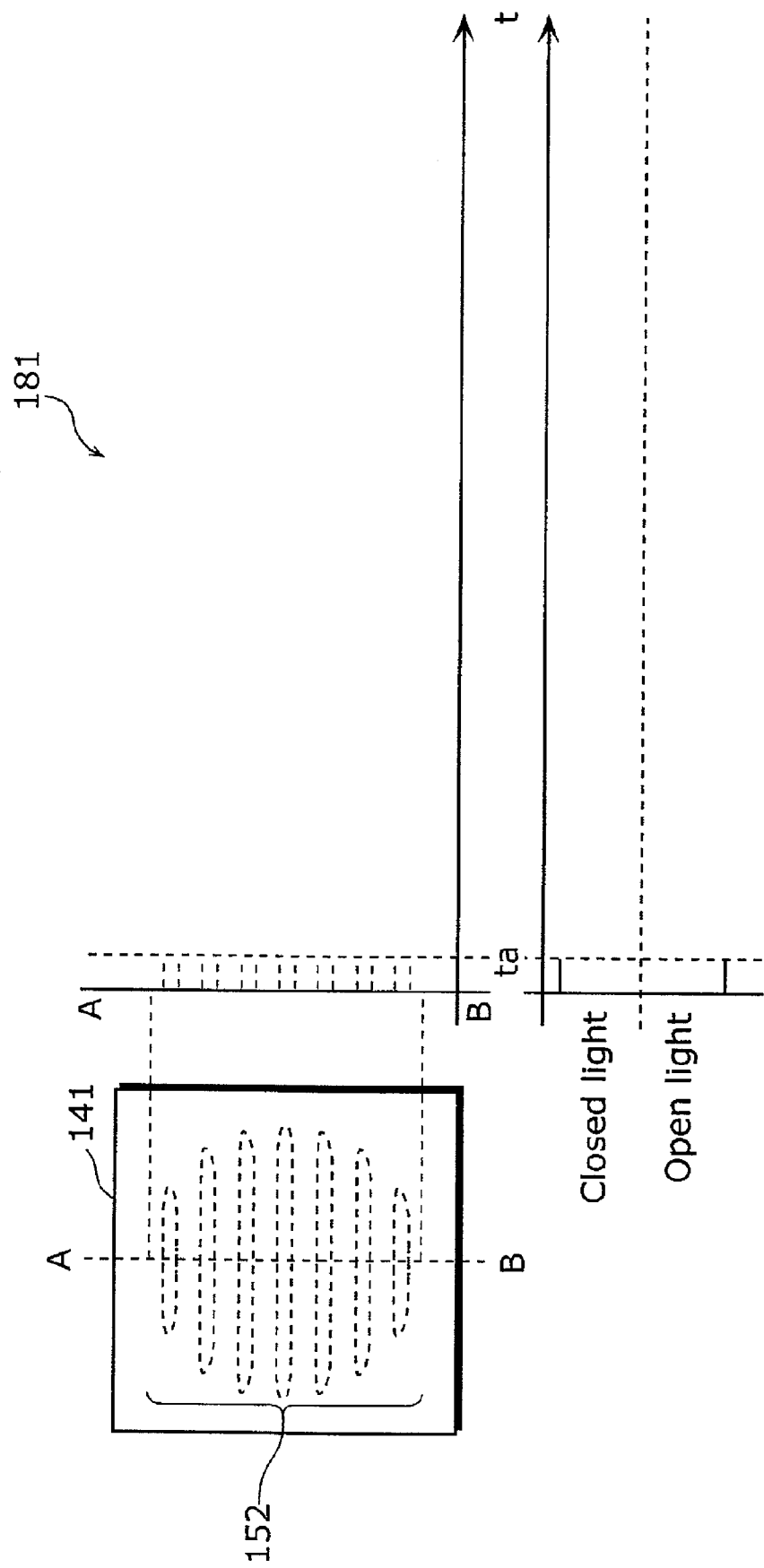
FIG. 11 is a first view showing an intensity displacement in line A-B of the image plane in the embodiment according to the present invention.

As shown in FIG. 11, a graph 181 indicates an intensity displacement in line A-B of the image plane 141. Suppose, at time ta, the arbitrary signal light is not yet emitted from the signal light generation unit 112, the closed light whose amplitude is constant is emitted from the closed light generation unit 132, and the open light whose amplitude is 0 is emitted from the open light generation unit 122. In this case, the spatial characteristic closed light obtained by transmitting the closed light through the grating pattern 136 is vertically incident on the image plane 141. As a result, the fringe pattern of the spatial characteristic closed light appears on the image plane 141. Here, the fringe pattern 152 of the spatial characteristic closed light has low-intensity crests (dotted-line regions) in a center part of the image plane 141. Meanwhile, the amplitude of the open light is 0, and so the spatial characteristic open light is regarded as 0 in amplitude and its explanation is omitted.

Figure 12:
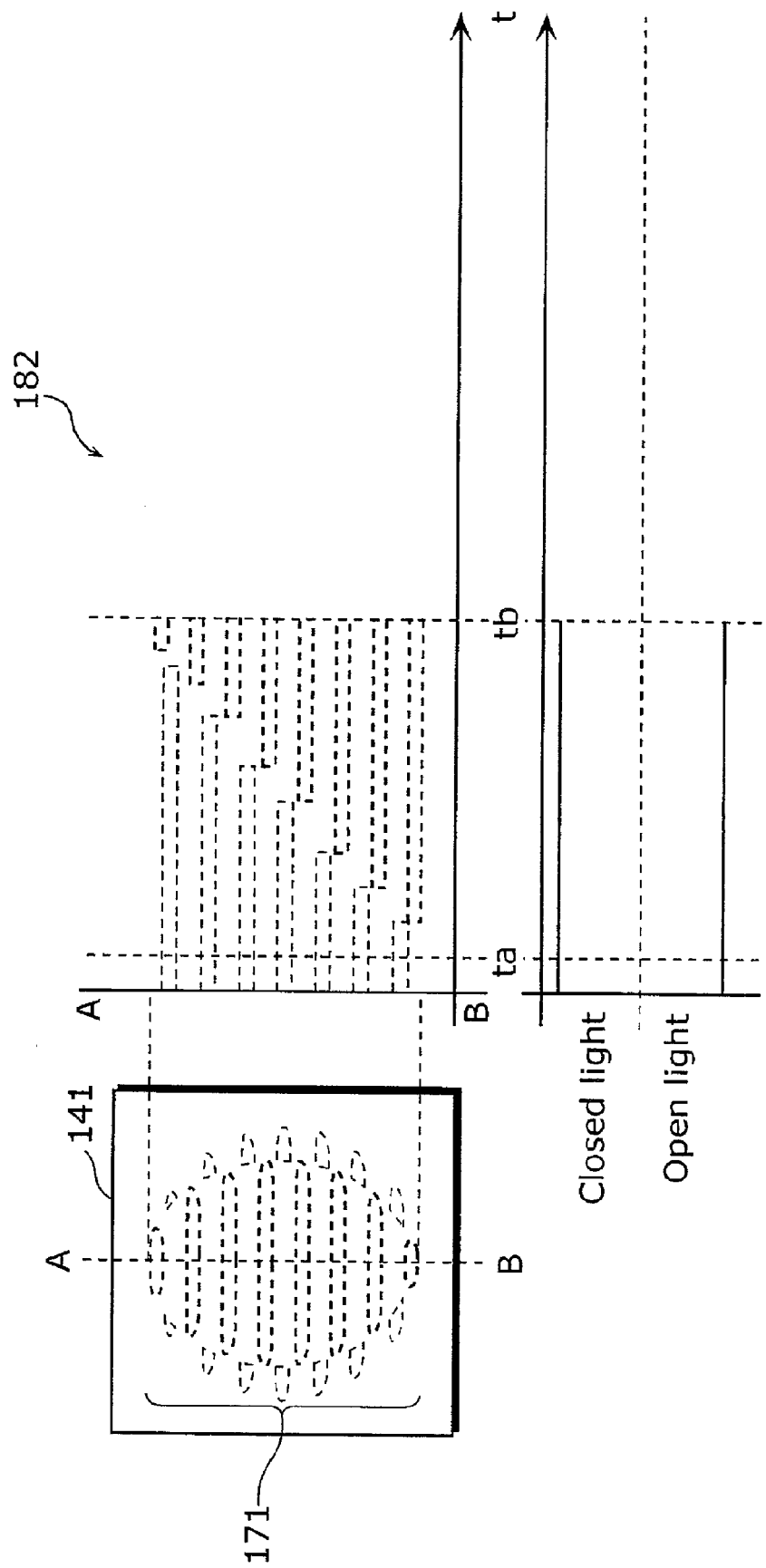
FIG. 12 is a second view showing an intensity displacement in line A-B of the image plane in the embodiment according to the present invention.

As shown in FIG. 12, a graph 182 indicates an intensity displacement in line A-B of the image plane 141. Suppose, at time tb, the arbitrary signal light is emitted from the signal light generation unit 112, the closed light whose amplitude is constant is emitted from the closed light generation unit 132, and the open light whose amplitude is 0 is emitted from the open light generation unit 122. In this case, the spatial characteristic signal light obtained by transmitting the signal light through the grating pattern 116 is obliquely incident on the image plane 141 along line A-B. The spatial characteristic closed light obtained by transmitting the closed light through the grating pattern 136 is vertically incident on the image plane 141. As a result, the closed moiré fringe pattern 171 appears on the image plane 141. Here, the closed moiré fringe pattern 171 has low-intensity crests (dashed-line regions) in a center part of the image plane 141, and further has low-intensity crests (dotted-line regions) in a periphery of the center part. Meanwhile, the amplitude of the open light is 0, and so the spatial characteristic open light is regarded as 0 in amplitude and its explanation is omitted.

Figure 13:
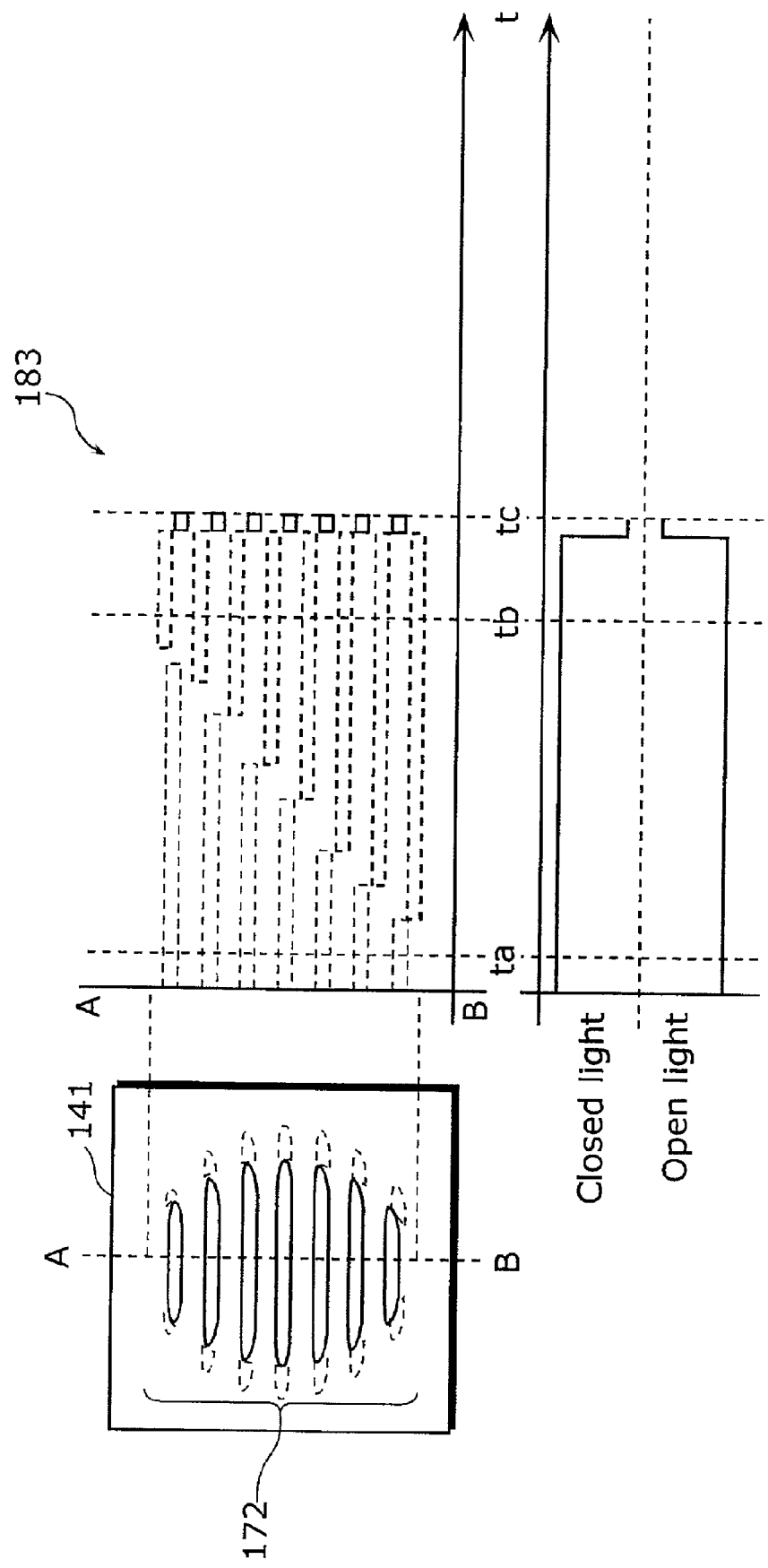
FIG. 13 is a third view showing an intensity displacement in line A-B of the image plane in the embodiment according to the present invention.

As shown in FIG. 13, a graph 183 indicates an intensity displacement in line A-B of the image plane 141. Suppose, at time tc, the arbitrary signal light is emitted from the signal light generation unit 112, the closed light whose amplitude is 0 is emitted from the closed light generation unit 132, and the open light whose amplitude is constant is emitted from the open light generation unit 122. In this case, the spatial characteristic signal light obtained by transmitting the signal light through the grating pattern 116 is obliquely incident on the image plane 141 along line A-B. The spatial characteristic open light obtained by transmitting the open light through the grating pattern 126 is vertically incident on the image plane 141. As a result, the open moiré fringe pattern 172 appears on the image plane 141. Here, the open moiré fringe pattern 172 has high-intensity crests (solid-line regions) in a center part of the image plane 141, and also has low-intensity crests (dotted-line regions) in a periphery of the center part. Meanwhile, the amplitude of the closed light is 0, and so the spatial characteristic closed light is regarded as 0 in amplitude and its explanation is omitted.

Figure 14:
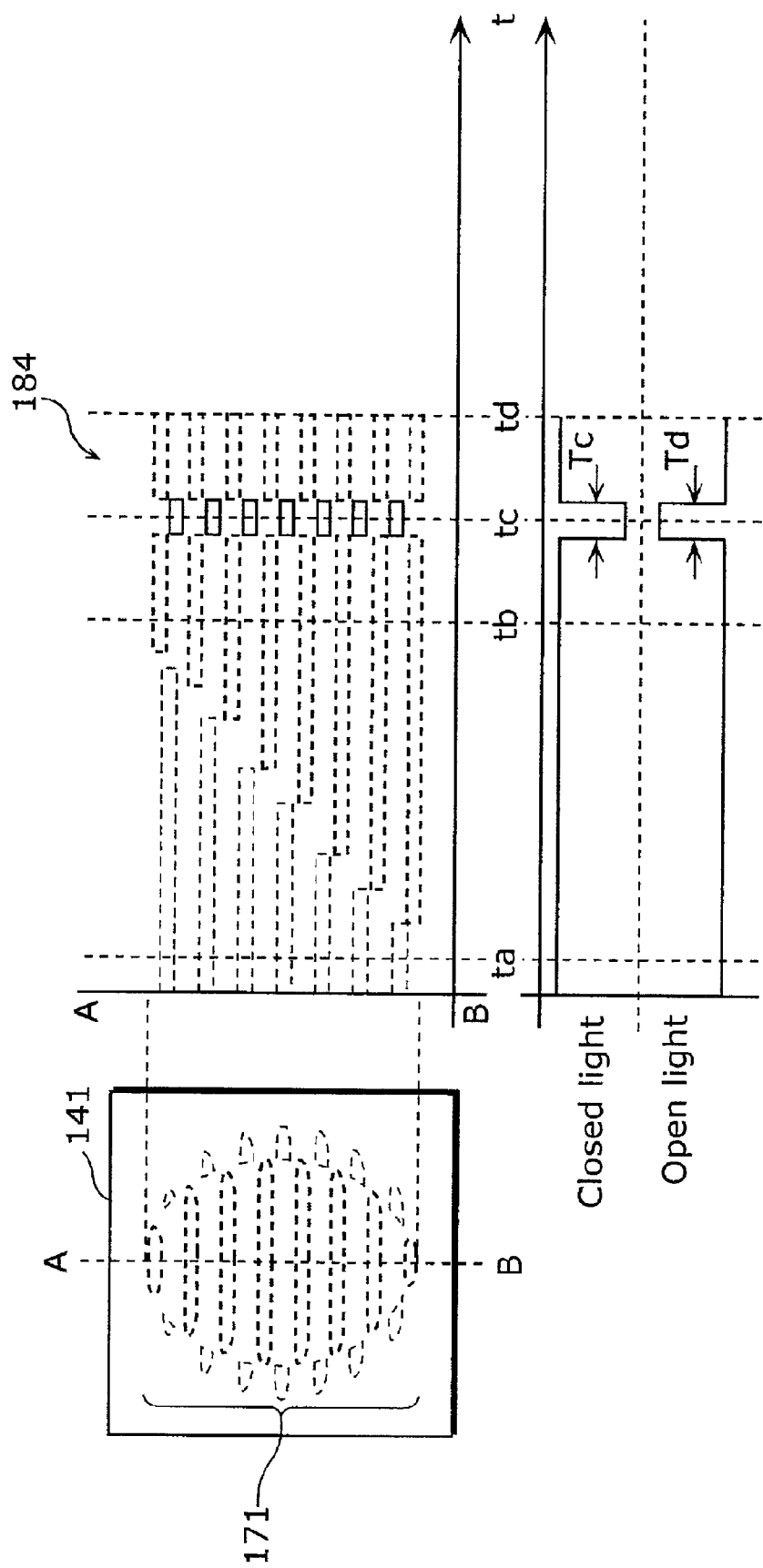
FIG. 14 is a fourth view showing an intensity displacement in line A-B of the image plane in the embodiment according to the present invention.

As shown in FIG. 14, a graph 184 indicates an intensity displacement in line A-B of the image plane 141. Suppose, at time td, the arbitrary signal light is emitted from the signal light generation unit 112, the closed light whose amplitude is constant is emitted from the closed light generation unit 132, and the open light whose amplitude is 0 is emitted from the open light generation unit 122. In this case, the spatial characteristic signal light obtained by transmitting the signal light through the grating pattern 116 is obliquely incident on the image plane 141 along line A-B. The spatial characteristic closed light obtained by transmitting the closed light through the grating pattern 136 is vertically incident on the image plane 141. As a result, the closed moiré fringe pattern 171 appears on the image plane 141. Here, the closed moiré fringe pattern 171 has low-intensity crests (dashed-line regions) in a center part of the image plane 141, and further has low-intensity crests (dotted-line regions) in a periphery of the center part. Meanwhile, the amplitude of the open light is 0, and so the spatial characteristic open light is regarded as 0 in amplitude and its explanation is omitted.

Figure 15:
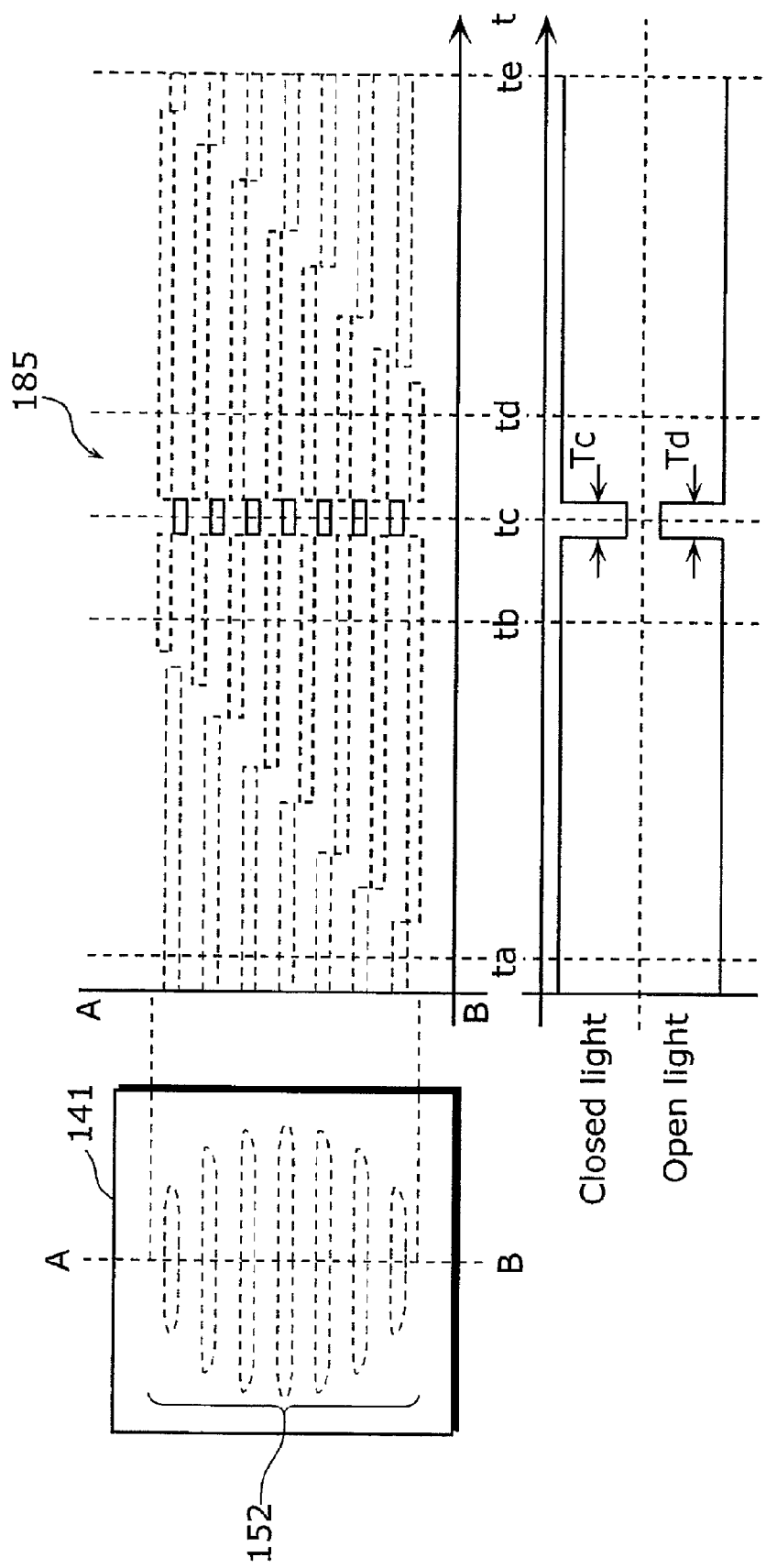
FIG. 15 is a fifth view showing an intensity displacement in line A-B of the image plane in the embodiment according to the present invention.

As shown in FIG. 15, a graph 185 indicates an intensity displacement in line A-B of the image plane 141. Suppose, at time te, the arbitrary signal light is no longer emitted from the signal light generation unit 112, the closed light whose amplitude is constant is emitted from the closed light generation unit 132, and the open light whose amplitude is 0 is emitted from the open light generation unit 122. In this case, the spatial characteristic closed light obtained by transmitting the closed light through the grating pattern 136 is vertically incident on the image plane 141. As a result, the fringe pattern of the spatial characteristic closed light appears on the image plane 141. Here, the fringe pattern 152 of the spatial characteristic closed light has low-intensity crests (dotted-line regions) in a center part of the image plane 141. Meanwhile, the amplitude of the open light is 0, and so the spatial characteristic open light is regarded as 0 in amplitude and its explanation is omitted.

As described above, according to the optical gating system 100 in this embodiment, high-sensitive, parallel, and ultrafast gating equal to or less than a subpicosecond can be realized without depending on coherence of signal light. This makes it possible to perform single-shot measurement in a depth direction, with there being no need for mechanical scanning.

The following describes a typical theoretical formula of moiré that is formed by time-varying illumination light used in the image processing apparatus 105 in the optical gating system according to the present invention. Assuming a simplest case where the amplitude uniformly changes in the space according to time signal f(t), intensity I of the closed moiré fringe pattern is given by the following Expression (1) with respect to f(t).

$$I_{CLOSE}(t; x) = f(t) \cdot \{1 + \cos(\alpha \cdot x)\} + \{1 + \cos(\beta \cdot x)\} \quad \text{[Expression 1]}$$
$$= 2f(t)\cos\left(\frac{\alpha+\beta}{2} \cdot x\right)\cos\left(\frac{\alpha-\beta}{2} \cdot x\right) +$$
$$1 + f(t) \cdot \{1 - \cos(\beta \cdot x)\}$$

Here, t denotes a time signal, and x denotes a spatial parameter.

When, for the moiré image given by the Expression (1), a high spatial frequency corresponding to a structure equal to or less than Δx that satisfies the conditions of the following Expressions (2), (3), (5), and (6) is rejected according to spatial frequency filtering by hardware or software, a moiré image given by an approximate expression of the following Expression (8) is obtained.

1) Relations between Δx and actual spatial dimensions corresponding to phase shift amounts φ of first cosine term cos((α+β)x/2) and third cosine term cos(βx) are given by the following Expressions (2) and (3).

$$\frac{2}{\alpha+\beta} \cdot \phi \ll \Delta x \quad \text{[Expression 2]}$$

$$\frac{1}{\beta} \cdot \phi \ll \Delta x \quad \text{[Expression 3]}$$

Here, 2φ/(α+β) and φ/β are the actual spatial dimensions corresponding to phase shift amounts φ of first cosine term cos((α+β)x/2) and third cosine term cos(βx).

2) A relation between Δx and an actual spatial dimension corresponding to phase shift amount φ of second cosine term cos((α−β)x/2) is given by the following Expression (4).

$$\frac{2}{\alpha-\beta} \cdot \phi \gg \Delta x \quad \text{[Expression 4]}$$

Here, 2φ/α−β is the actual spatial dimension corresponding to phase shift amount φ of second cosine term cos((α−β)x/2).

Furthermore, the following state and approximation are taken into account.

1) Relations between Δx and actual spatial dimensions corresponding to phase shift amounts φ/2 and φ of first cosine term cos((α+β)x/2) and third cosine term cos(βx) are given by the following Expressions (5) and (6).

$$\frac{\phi}{\alpha+\beta} \ll \Delta x \quad \text{[Expression 5]}$$

$$\frac{1}{\beta} \cdot \phi \ll \Delta x \quad \text{[Expression 6]}$$

Here, φ/(α+β) and φ/β are the actual spatial dimensions corresponding to phase shift amounts φ of first cosine term cos((α+β)x/2) and third cosine term cos(βx).

2) A relation between Δx and an actual spatial dimension corresponding to phase shift amount φ/2 of second cosine term cos((α−β)x/2) is given by the following Expression (7).

$$\frac{\phi}{\alpha-\beta} \gg \Delta x \quad \text{[Expression 7]}$$

Here, φ/α−β is the actual spatial dimension corresponding to phase shift amount φ of second cosine term cos((α−β)x/2).

Accordingly, intensity I of the open moiré fringe pattern is given by the following Expression (8) with respect to f(t).

$$I_{OPEN}(t; x) = f(t) \cdot \{1 + \cos(\alpha \cdot x)\} + \{1 + \cos(\beta \cdot x + \phi)\} \quad \text{[Expression 8]}$$
$$= 2f(t)\cos\left(\frac{\alpha+\beta}{2} \cdot x + \frac{\phi}{2}\right)\cos\left(\frac{\alpha-\beta}{2} \cdot x - \frac{\phi}{2}\right) +$$
$$1 + f(t) \cdot \{1 - \cos(\beta \cdot x + \phi)\}$$

As shown by the above state and approximation, ((α−β)/2) in the second cosine term in Expressions (1) and (8) has an extremely small frequency, and so its phase shift amount φ/2 has a significant contribution as a phase change. On the other hand, $((\alpha+\beta)/2)$ in the first cosine term and $\beta$ in the third cosine term in the Expressions (1) and (8) have large frequencies, and so phase shift amounts $\phi/2$ and $\phi$ in the first and third cosine terms have only small contributions as phase changes. This being so, a moiré contribution can be expressed using the following Expressions (9) to (14).

$$I_{CLOSE}(t; x) = 2f(t)\cos\left(\frac{\alpha+\beta}{2}\cdot x\right)\cos\left(\frac{\alpha-\beta}{2}\cdot x\right) + \quad \text{[Expression 9]}$$
$$1 + f(t)\cdot\{1 - \cos(\beta\cdot x)\}$$

$$I_{OPEN}(t; x) \sim 2f(t)\cos\left(\frac{\alpha+\beta}{2}\cdot x\right)\cos\left(\frac{\alpha-\beta}{2}\cdot x - \frac{\phi}{2}\right) + \quad \text{[Expression 10]}$$
$$1 + f(t)\cdot\{1 - \cos(\beta\cdot x)\}$$

$$2\pi \Longrightarrow \lambda \quad \text{[Expression 11]}$$

$$\frac{\phi}{2} \Longrightarrow \frac{\lambda}{2\pi}\cdot\frac{\phi}{2} \quad \text{[Expression 12]}$$

$$\cos\left(\frac{\alpha+\beta}{2}x + \frac{\phi}{2}\right) \Longrightarrow \lambda = \frac{2}{\alpha+\beta}2\pi = \frac{4\pi}{\alpha+\beta} \quad \text{[Expression 13]}$$

$$\frac{\lambda}{2\pi}\cdot\frac{\phi}{2} = \frac{4\pi}{\alpha+\beta}\cdot\frac{\phi}{4\pi} = \frac{\phi}{\alpha+\beta} \quad \text{[Expression 14]}$$

Phase shift amount $\phi/2$ in the second cosine term, which is the difference between the above Expression (9) and approximate Expression (10), indicates a phase difference of the moiré contribution.

INDUSTRIAL APPLICABILITY

The present invention can be used, for example, as an optical gating system using a moiré effect and in particular as an optical gating system that is capable of realizing high-sensitive, parallel, and ultrafast gating. The present invention can be applied to optical measurement, optical communication, and optical systems in general which use ultrashort optical pulses equal to or less than a subpicosecond. In detail, the present invention can be applied to a fluorescence microscope, a Raman spectromicroscope, a medical measurement instrument which requires a camera having an ultrafast gate, and the like.

The invention claimed is:

1. An optical gating system that, in a same manner as performing an opening and closing operation of a gate, controls passage of signal light incident on a gate region which functions as the gate, by using a moiré effect, said optical gating system comprising:
a first spatial characteristic light emission unit configured to convert the signal light to first spatial characteristic light whose intensity distribution has spatial periodicity, and emit the first spatial characteristic light to the gate region so that the first spatial characteristic light is obliquely incident on the gate region; and
a second spatial characteristic light emission unit configured to emit, to the gate region, second spatial characteristic light whose intensity distribution has spatial periodicity, the second spatial characteristic light acting to change an intensity of the first spatial characteristic light in the gate region when overlaid with the first spatial characteristic light in the gate region,
wherein in a predetermined one of an open state and a closed state in the opening and closing operation, a moiré fringe pattern is created in the gate region by overlaying the first spatial characteristic light and the second spatial characteristic light, and
in another one of the open state and the closed state in the opening and closing operation, the moiré fringe pattern by the second spatial characteristic light is not created in the gate region.

2. The optical gating system according to claim 1,
wherein the second spatial characteristic light is spatial characteristic light acting in a direction in which the intensity of the first spatial characteristic light is decreased, and
the predetermined state in which the second spatial characteristic light is emitted is the closed state in the opening and closing operation.

3. The optical gating system according to claim 2, further comprising
a third spatial characteristic light emission unit configured to emit, to the gate region, third spatial characteristic light whose intensity distribution has spatial periodicity, the third spatial characteristic light acting in a direction in which the intensity of the first spatial characteristic light is increased in the gate region when overlaid with the first spatial characteristic light in the gate region,
wherein in the closed state in the opening and closing operation, a first moiré fringe pattern is created in the gate region by overlaying the first spatial characteristic light and the second spatial characteristic light, and
in the open state in the opening and closing operation, a second moiré fringe pattern is created in the gate region by overlaying the first spatial characteristic light and the third spatial characteristic light.

4. The optical gating system according to claim 3,
wherein said first spatial characteristic light emission unit is configured to emit light for forming a first fringe pattern in the gate region, as the first spatial characteristic light,
said second spatial characteristic light emission unit is configured to emit, as the second spatial characteristic light, light for forming a second fringe pattern in the gate region in a time period excluding a predetermined time period from a duration of the emission of the first spatial characteristic light to the gate region, the second fringe pattern forming the first moiré fringe pattern when overlaid with the first fringe pattern, and
said third spatial characteristic light emission unit is configured to emit, as the third spatial characteristic light, light for forming a third fringe pattern in the gate region in the predetermined time period, the third fringe pattern forming the second moiré fringe pattern when overlaid with the first fringe pattern.

5. The optical gating system according to claim 4,
wherein said first spatial characteristic light emission unit is configured to emit light obtained as a result of the signal light entering a first grating pattern, as the first spatial characteristic light,
said second spatial characteristic light emission unit is configured to emit light obtained as a result of predetermined light entering a second grating pattern, as the second spatial characteristic light, and
said third spatial characteristic light emission unit is configured to emit light obtained as a result of predetermined light entering a third grating pattern, as the third spatial characteristic light.

6. The optical gating system according to claim 3, further comprising:
an imaging unit configured to position an image plane to coincide with the gate region, and capture the second moiré fringe pattern projected on the image plane; and an image processing unit configured to extract, from a bright portion of the second moiré fringe pattern captured by said imaging unit, an intensity distribution in a direction in which the first spatial characteristic light travels in the region, and specify a time waveform of the signal light from the extracted intensity distribution.

7. The optical gating system according to claim 1,
wherein the second spatial characteristic light is spatial characteristic light acting in a direction in which the intensity of the first spatial characteristic light is increased, and
the predetermined state in which the second spatial characteristic light is emitted is the open state in the opening and closing operation.

8. The optical gating system according to claim 1,
wherein said second spatial characteristic light emission unit includes a liquid crystal spatial light modulator, and is configured to convert predetermined light by said liquid crystal spatial light modulator and emit the converted light to the gate region as the second spatial characteristic light.

9. An optical gating method for, in a same manner as performing an opening and closing operation of a gate, controlling passage of signal light incident on a gate region which functions as the gate, by using a moiré effect, said optical gating method comprising:
  converting the signal light to first spatial characteristic light whose intensity distribution has spatial periodicity, and emitting the first spatial characteristic light to the gate region so that the first spatial characteristic light is obliquely incident on the gate region; and
  emitting, to the gate region, second spatial characteristic light whose intensity distribution has spatial periodicity, the second spatial characteristic light acting to change an intensity of the first spatial characteristic light in the gate region when overlaid with the first spatial characteristic light in the gate region,
  wherein in a predetermined one of an open state and a closed state in the opening and closing operation, a moiré fringe pattern is created in the gate region by overlaying the first spatial characteristic light and the second spatial characteristic light, and
  in another one of the open state and the closed state in the opening and closing operation, the moiré fringe pattern by the second spatial characteristic light is not created in the gate region.

* * * * *